(12) United States Patent
Osborn et al.

(10) Patent No.: US 12,093,768 B2
(45) Date of Patent: Sep. 17, 2024

(54) TRANSPARENT TRANSACTION CARD

(71) Applicant: Capital One Services, LLC, McLean, VA (US)

(72) Inventors: Kevin Osborn, Newton Highlands, MA (US); Tyler Maiman, Melville, NY (US); Bryant Yee, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/954,785

(22) Filed: Sep. 28, 2022

(65) Prior Publication Data
US 2024/0104330 A1 Mar. 28, 2024

(51) Int. Cl.
*G06K 19/077* (2006.01)

(52) U.S. Cl.
CPC .............................. *G06K 19/07722* (2013.01)

(58) Field of Classification Search
CPC .. G06K 19/07; G06K 19/077; G06K 19/0772; G06K 19/07722
See application file for complete search history.

(56) References Cited

U.S. PATENT DOCUMENTS

| | | | |
|---|---|---|---|
| 7,188,775 B2 | 3/2007 | Waters | |
| 8,061,619 B2 | 11/2011 | Halbur et al. | |
| 8,505,827 B2 * | 8/2013 | Le Garrec | G06K 19/07769 235/487 |
| 10,482,364 B2 | 11/2019 | Roach et al. | |
| 10,867,230 B2 | 12/2020 | Suthar | |
| 10,963,768 B2 | 3/2021 | Mosteller | |
| 11,121,588 B2 | 9/2021 | Koeppel et al. | |
| 11,230,136 B1 * | 1/2022 | Legge | B42D 25/30 |
| 2008/0173717 A1 * | 7/2008 | Antebi | G01S 15/74 235/439 |
| 2009/0109701 A1 * | 4/2009 | Hsieh | B42D 15/02 362/604 |
| 2015/0258835 A1 * | 9/2015 | Fischer | B42D 25/00 156/275.7 |
| 2018/0165563 A1 * | 6/2018 | Suthar | G06K 19/07705 |

FOREIGN PATENT DOCUMENTS

JP 04332686 A * 11/1992

* cited by examiner

*Primary Examiner* — Laura A Gudorf
(74) *Attorney, Agent, or Firm* — Sterne, Kessler, Goldstein & Fox P.L.L.C.

(57) ABSTRACT

A transaction card is provided. The transaction card can include a luminous layer having a sensitive information component. The sensitive information component includes personal account data and can be selectively illuminated by a light source by refracting light emitted by the light source. A switch and power source are provided to selectively energize the light source.

20 Claims, 14 Drawing Sheets

TRANSPARENT TRANSACTION CARD

FIELD

The present disclosure relates to a transaction card for use with a card reader. In particular, a transparent transaction card with a light source to reveal information.

BACKGROUND

Transaction cards, such as credit cards and debit cards, are convenient tools for providing payment for goods and services. Europay, MasterCard and Visa (EMV) transaction cards can store a user's account information in embedded integrated circuit (IC) chips and/or magnetic stripes. These aspects can be visible on the transaction cards to facilitate payment. In addition, the user's account information can be printed or stamped on the card.

BRIEF SUMMARY

Aspects provide a transaction card. The transaction card can include a luminous layer. The luminous layer can include a sensitive information component having personal account data. The transaction card can also include an LED light source to selectively illuminate the sensitive information component such that the sensitive information component refracts light from the LED light source to reveal the sensitive information component; and a first power source to selectively energize the LED light source and illuminate the sensitive information component.

In some aspects, the personal payment account data is a credit card number. In some aspects, the personal payment account data is a card verification value. In some aspects, the LED light source is disposed along an edge of the transaction card. In some aspects, the transaction card also includes a switch to energize and deenergize the LED light source, and a second power source coupled to the switch. The first power source can be powered by an external device. In some aspects, the LED light source illuminates the entire transaction card. In some aspects, the transaction card also includes a second sensitive information component having personal account data. In some aspects, the LED light source selectively illuminates the second sensitive information component such that the second sensitive information component refracts light from the LED light source to reveal the second sensitive information component. In some aspects, the transaction card also includes a bottom layer. The material of the luminous top layer can be different than the material of the bottom layer. In some aspects, the transaction card can also include an EMV chip. In some aspects, the luminous top layer is transparent.

Aspects also provide a transaction card including a luminous layer; a first sensitive information component disposed in the luminous layer and having personal account data; a first LED light source to selectively illuminate the first sensitive information component such that the first sensitive information component refracts light from the first LED light source to reveal the first sensitive information component; a first switch to energize and deenergize the first LED light source; and a portable power source coupled to the first switch to selectively energize the first LED light source and illuminate the first sensitive information component.

In some aspects, the transaction card can also include a second sensitive information component disposed in the luminous layer and having personal account data; a second LED light source to selectively illuminate the second sensitive information component such that the second sensitive information component refracts light from the second LED light source to reveal the second sensitive information component; and a second switch to energize and deenergize the second LED light source. The portable power source can be coupled to the second switch to selectively energize the second LED light source and illuminate the second sensitive information component. In some aspects, the power source can be disposed along an edge of the transaction card. In some aspects, the first sensitive information component can be printed, etched, pressed, or extruded. In some aspects, the first sensitive information component is transparent. In some aspects, the first sensitive information component is fluorescent.

Aspects also provide a method of manufacturing a transaction card. The method can include providing a luminous layer and a bottom layer; forming a sensitive information component on the luminous layer, the sensitive information component having personal account data; providing an LED light source to selectively illuminate the sensitive information component when the LED light source is energized such that light is refracted from the LED light source to reveal the sensitive information component; providing a switch to energize and deenergize the LED light source; and providing a portable power source coupled to the switch to selectively energize the LED light source and illuminate the sensitive information component.

In some aspects, forming the sensitive information component on the luminous layer includes forming a texture on the luminous layer. In some aspects, the method also includes providing an EMV chip between the luminous layer and the bottom layer.

BRIEF DESCRIPTION OF THE DRAWINGS

The accompanying drawings, which are incorporated herein and form part of the specification, illustrate aspects and, together with the description, further serve to explain the principles of the aspects and to enable a person skilled in the relevant art(s) to make and use the aspects.

DETAILED DESCRIPTION

Figure 1:
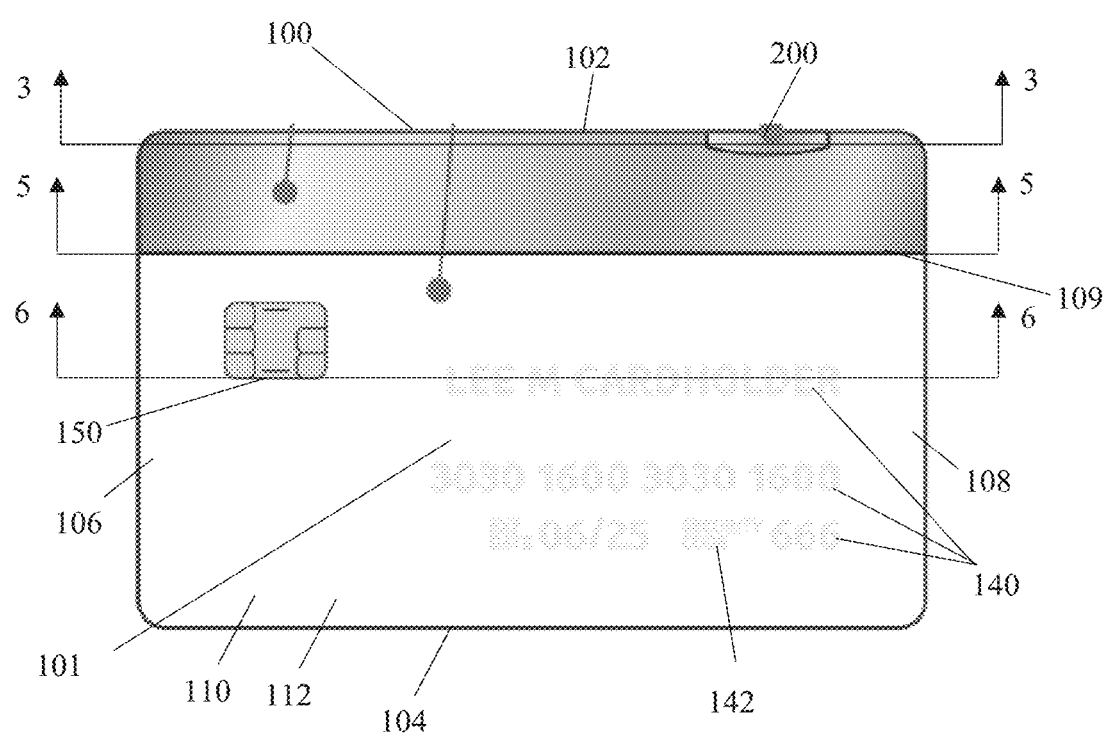
FIG. 1 shows a front view of a transaction card according to various aspects.

The present invention(s) will now be described in detail with reference to aspects thereof as illustrated in the accompanying drawings. References to "one aspect," "an aspect," "an exemplary aspect," etc., indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The following examples are illustrative, but not limiting, of the present aspects. Other suitable modifications and adaptations of the variety of conditions and parameters normally encountered in the field, and which would be apparent to those skilled in the art, are within the spirit and scope of the disclosure.

A card reader, as used herein, can refer to a device that is capable of reading a magnetic stripe or an electronic chip of a transaction card, or that can communicate with an antenna of a transaction card, such as a near field communication (NFC) antenna. Card readers can also include a radio frequency identification (RFID) reader for reading RFID tags or smart labels, and can be capable of wireless communication, such as via Bluetooth or other short range communication protocol.

Aspects described herein relate to a transaction card that appears transparent. Visual features of the transaction card that provide the user's account information can be revealed from a user actuation on the transaction card. For example, a switch on the transaction card can be actuated to reveal a credit card number to facilitate a transaction. As a result, the user's account information is secured because the user is protected from unauthorized retrieval of their account information.

Credit cards and other types of transaction cards, such as debit cards, automated teller machine (ATM) cards, gift cards, and the like are often used as a convenient alternative to cash or paper money for purchasing goods and services. Existing transaction cards generally include a single magnetic stripe, also referred to as a magnetic strip or magstripe, arranged along one side of the transaction card on one surface (e.g., the rear surface) of the transaction card. In order to allow the consumer to know the location of the magnetic stripe, the magnetic stripe is colored in a different color than the remainder of the card. Additionally, cards can display identifying information, such as a card number, expiration date, and card verification value and is associated with a user's payment account. The identifying information for providing access to the user's payment account can be visible. For example, identifying information can be printed onto a card in a different color than the remainder of the card. Additionally, information can be sized for readability.

However, visibility can put a user's payment account information at risk of unauthorized use. For example, printed identifying information can easily be copied or photographed if viewed, exposing the user's payment account to potential fraud. Exposure is aggravated by the growing prevalence of high resolution cameras in public locations, which can include handheld devices such as smartphones. Advances in camera technology widens the proximity in which a user's payment account information is vulnerable. Further, creating aesthetically pleasing cards can result in increased contrast between the identifying information and the remainder of the card, increasing the visibility of sensitive payment account information.

The transaction card described herein does not show any data when viewed. Accordingly, information related to a user's payment account cannot be captured by a camera regardless of distance. The card can appear transparent to prevent fraudulent access to the user's payment account. By actuating a switch, the user can selectively reveal identifying information when they wish to complete a transaction. The switch can activate an internal light source to emit a light, which exits through the identifying information. Construction of the transaction card can facilitate internal reflection such that light escapes at selected locations, e.g., through the identifying information. For example, the transaction card can include a transparent layer in which identifying information is milled. In some aspects, the identifying information can be printed inside the card with a different material than the remainder of the card. The material distinction can cause the light to bend to follow a small enough angle such that it escapes after passing through the identifying information. In some aspects, identifying information can be printed with fluorescent material, requiring UV (ultraviolet) light for visibility. In some aspects, the identifying information can be injection molded with the transaction card.

The transaction card can also facilitate visibility in low light or dark environments. The internal light source provided by the transaction card can be actuated to make visible identifying information for a user's payment account to complete a transaction. The user can release activation of the internal light source to conceal the identifying information.

In some aspects, external light sources additionally or alternatively can render the identifying information visible. External light sources can be provided at transaction points where a user is to process a payment with a card reader. Aspects also provide devices having external light sources that can disperse light to the transaction card such that light refracts through identifying information. These devices can be utilized in personal spaces, such as homes and offices where users can require their payment account information to make online purchases or to fill out forms. The devices can be setup at convenient locations to allow identifying information to be revealed as needed. In some aspects, the devices can recharge a portable power source of the transaction card.

The transaction card described herein will now be discussed with reference to the drawings. A transaction card 100 is shown in FIG. 1. Transaction card 100 and components thereof can be formed using injection molding, sheet forming, lamination, among other methods. Transaction card 100 can include a central area 101 between a top end 102 and a bottom end 104, where bottom end 104 is opposite top end 102. In addition, transaction card 100 can include a first side 106 and a second side 108 opposite first side 106. Central area 101 can additionally be between first side 106 and second side 108. In some aspects, transaction card 100 can include an edge 109. In some aspects, transaction card 100 can communicate personal information or account information to an external device (e.g., a card reader, smartphone, computer, etc.) electrically using EMV protocol and/or wirelessly using NFC protocol. In some aspects, transaction card 100 can be physically compliant with ISO/IEC 7810

ID-1 such that transaction card 100 has a length of approximately 85.60 mm (millimeters), a width of approximately 53.98 mm, and a thickness of approximately 0.76 mm, in some aspects, transaction card 100 can have a greater thickness.

Transaction card 100 can include one or more layers stacked on top of one another. A top layer 110 can be the front-facing layer. In some aspects, top layer 110 can include plastics (e.g., polycarbonate, high-density polyethylene, kydex thermoplastic, or acrylonitrile butadiene), metals (e.g., brass, copper, stainless steel, gold, palladium, or alloys thereof), and/or other materials (e.g., acrylic, polyester). In some aspects, top layer 110 can be opaque and/or can include one or more colors. In some aspects, top layer 110 appears non-opaque, e.g., clear, transparent, or translucent, such that information components 140 are not visible. In some aspects, top layer 110 is a light-penetrable layer. In some aspects, light-penetrable top layer 110 can be clear, transparent, or translucent, or can include color to allow light to pass into transaction card 100.

Top layer 110 can display one or more information components 140. Information components 140 can be formed in or on a top surface 112 of top layer 110. For example, information components 140 can be disposed in central area 101. Information components 140 can include a variety of payment account data of a user, such as a card number, expiration date, and card verification value. Each information component 140 can facilitate a payment transaction and is, thus, sensitive data. In some aspects, information components 140 can appear invisible along with the remainder of top layer 110. In some aspects, information components 140 can be passive components that are non-powered and redirect light from another source. In some aspects, information components 140 can include one or more textures 142. As light passes through transaction card 100, textured information components 140 can drive the light to escape, thereby revealing the information components 140 formed by textures 142, which are normally not visible.

In some aspects, transaction card 100 can be provided with one or more contact pads 150. Contact pads 150 can be embedded within top layer 110 to facilitate a payment transaction. In some aspects, contact pad 150 can be disposed along first side 106 of transaction card 100. As shown, information components 140 can be disposed away from contact pad 150 along second side 108 of transaction card 100. In this way, contact pad 150 and information components 140 do not physically intersect and do not obstruct each other's functions on transaction card 100.

Figure 2:
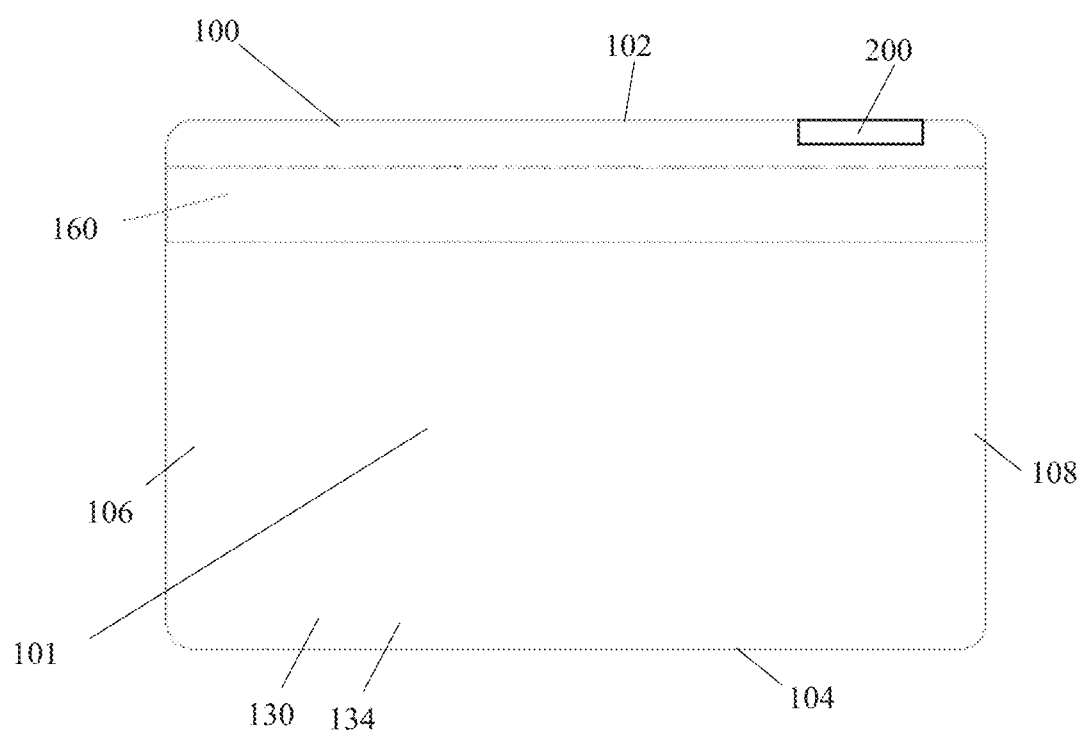
FIG. 2 shows a rear view of the transaction card of FIG. 1.
Figure 3:
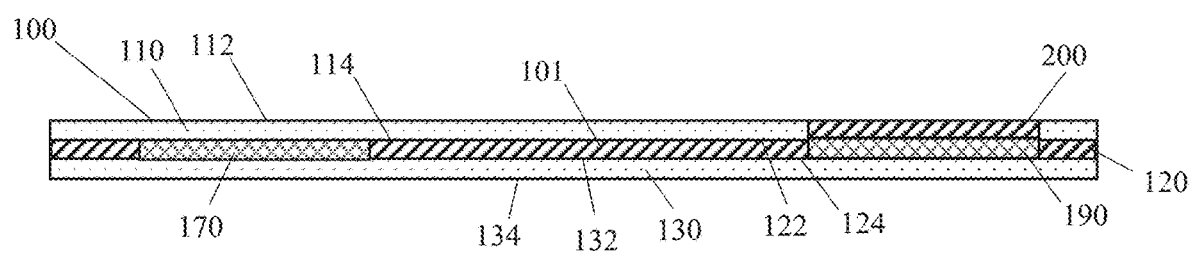
FIG. 3 shows a section view of the transaction card of FIG. 1 along line 3-3.

In some aspects, transaction card 100 can include a switch 200. In some aspects, switch 200 can be on an opposite side of edge 109 as compared to information components 140 and/or contact pad 150. In some aspects, switch 200 can be disposed within transaction card 100 between top layer 110 and bottom layer 130 (FIGS. 2-3). In some aspects, switch 200 can be disposed along top end 102. In some aspects, switch 200 can be accessible from top layer 110. In some aspects, switch 200 can span the thickness of transaction card 100. As with contact pad 150, information components 140 can be disposed away from switch 200, such as along bottom end 104 of transaction card 100. In this way, switch 200 and information components 140 do not physically intersect and do not obstruct each other's functions on transaction card 100. Switch 200 can also be disposed separately from contact pad 150 on transaction card 100. Accordingly, switch 200 and contact pad 150 also do not physically intersect and do not obstruct each other's functions.

With reference to FIGS. 1-2, transaction card 100 can also include a magnetic stripe 160. Magnetic stripe 160 can be disposed on a bottom layer 130, where bottom layer 130 is opposite top layer 110. In some aspects, bottom layer 130 can include plastics (e.g., polycarbonate, high-density polyethylene, kydex thermoplastic, or acrylonitrile butadiene), metals (e.g., brass, copper, stainless steel, gold, palladium, or alloys thereof), and/or other materials (e.g., acrylic, polyester). Bottom layer 130 can include a bottom surface 134 on which magnetic stripe 160 is applied. In some aspects, magnetic stripe 160 is imprinted with magnetic ink. In some aspects, magnetic stripe 160 is applied via a hot stamping method. In some aspects, magnetic strip 160 can form a portion of bottom surface 114. In some aspects, magnetic stripe 160 can be disposed along top end 102 of transaction card 100. Additionally, magnetic stripe 160 can be formed across transaction card 100 from first side 106 to second side 108. One or more information components 140 can additionally or alternatively be formed in or on bottom surface 134. As with contact pad 150, information components 140 can be disposed away from magnetic stripe 160, such as along bottom end 104 of transaction card 100. In this way, magnetic stripe 160 and information components 140 do not physically intersect and do not obstruct each other's functions on transaction card 100.

In some aspects, bottom layer 130 can be adjacent to top layer 110. Each of top layer 110 and bottom layer 130 can be laminated. Lamination can facilitate securing different layers together, such as top layer 110 and bottom layer 130. Transaction card 100 can include additional layers. For example, transaction card 100 can include a middle layer 120, as shown in FIG. 3. Middle layer 120 can be disposed between top layer 110 and bottom layer 130. Like top layer 110 and bottom layer 130, middle layer 120 can be laminated to secure middle layer 120 to the other layers of transaction card 100. As shown, top layer 110 can include a bottom surface 114 and bottom layer 130 can include a top surface 132. Middle layer 120 can include a top surface 122 that is adjacent to bottom surface 114, and a bottom surface 124 that is adjacent to top surface 132. In some aspects, the thickness of each of top layer 110, middle layer 120, and bottom layer 130 can be chosen to impact light reflection and refraction.

In some aspects, bottom layer 130 can include a design, images, and/or one or more colors to customize transaction card 100 for aesthetic appeal. In some aspects, bottom layer 130 can be a reflective backing. In some aspects, bottom layer 130 can include a reflective material, such as a reflective metal (e.g., a mirror), glass, and/or plastic. For example, in some aspects, bottom layer 130 is coated in reflective material. Accordingly, as light passes through light-penetrable top layer 110, bottom layer 130 can reflect light back into transaction card 100. In this way, the amount of light that escapes is reduced and the amount of light that reflects back into transaction card 100 is increased, allowing more light to escape through information components 140 so they appear brighter and more visible.

In some aspects, middle layer 120 can include plastics (e.g., polycarbonate, high-density polyethylene, kydex thermoplastic, or acrylonitrile butadiene), metals (e.g., brass, copper, stainless steel, gold, palladium, or alloys thereof), and/or other materials (e.g., acrylic, polyester). In some aspects, middle layer 120 can be a PCB (printed circuit board) layer. In some aspects, middle layer 120 can be a flexible plastic substrate in which a flexible PCB is printed. In some aspects, middle layer 120 is a chassis (e.g., a frame) in which a PCB is mounted. Accordingly, middle layer 120 can incorporate a PCB to include electronic components, power sources, and control aspects of transaction card 100.

Figure 4:
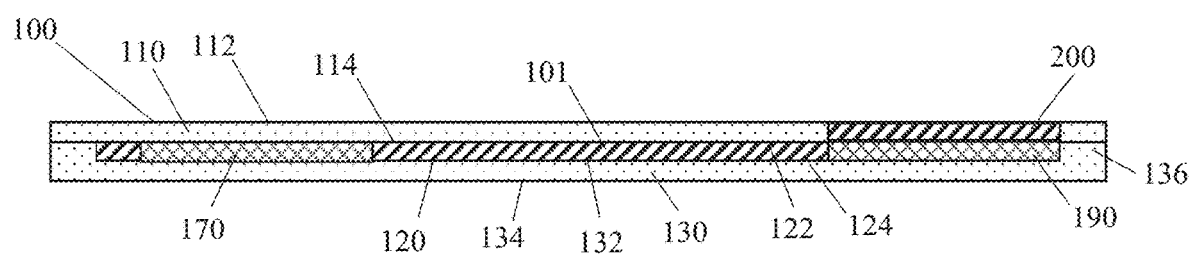
FIG. 4 shows a section view of the transaction card of FIG. 1 according to various aspects.

In some aspects, middle layer 120 can be combined with bottom layer 130. In other aspects, bottom layer 130 is a backing layer to middle layer 120, which can be a PCB layer. For example, middle layer 120 having a PCB (either printed or mounted) can be supported or backed by bottom layer 130. In some aspects, bottom layer 130 can be a rigid backing layer to support middle layer 120. In some aspects, as shown in FIG. 4, bottom layer 130 includes a chassis 136. Middle layer 120 can be a PCB that is mounted onto chassis 136 of bottom layer 130. As middle layer 120 can include a PCB, top layer 110 can be a protective layer that retains and safeguards the PCB and chip 170. In some aspects, bottom layer 130 can be a rigid backing layer to support top layer 110.

As shown in FIGS. 3-4, in some aspects, a power source 190 can be integrated into middle layer 120. Power source 190 can be a portable power source. For example, power source 190 can include a rechargeable battery according to an aspect. Power source 190 can include a solar battery according to another aspect. In some aspects, power source 190 can be a non-rechargeable battery, such as a lithium-ion battery or another single-use battery. In some aspects, switch 200 can be coupled to power source 190. In an aspect, switch 200 can be a pressure switch or a push button switch that can be actuated by depressing switch 200 (e.g., pushing or applying a force to it). In some aspects, switch 200 can be disposed within transaction card 100 between top layer 110 and bottom layer 130 such that top layer 110 and bottom layer 130 are pushed together to actuate switch 200. By maintaining switch 200 in a depressed state, power can be transferred to one or more light sources 180 (FIG. 5) to selectively reveal one or more information components 140 (FIG. 1). In some aspects, switch 200 can include a capacitive touch sensor such that contact with switch can transfer power to one or more light sources 180 (FIG. 5) to selectively reveal one or more information components 140 (FIG. 1). Releasing switch 200 can return transaction card 100 to a concealed state in which information components 140 (FIG. 1) are not visible.

Figure 6:
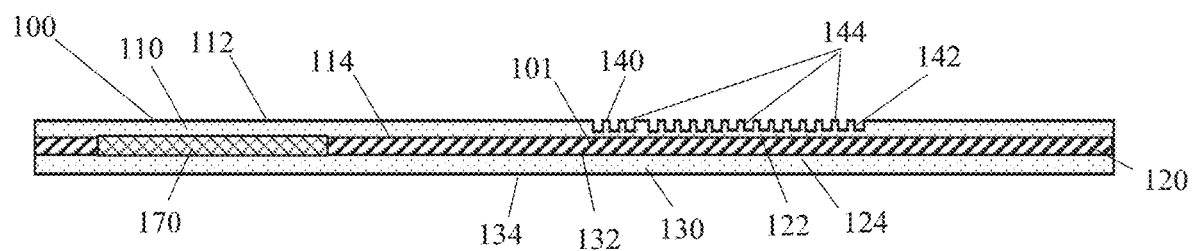
FIG. 6 shows a section view of the transaction card of FIG. 1 along line 6-6.

With reference to FIGS. 3 and 6, transaction card 100 can include one or more integrated chips (e.g., EMV chips), such as chip 170. In some aspects, chip 170 can be embedded in middle layer 120 and can store a user's payment account data to facilitate a payment transaction. In some aspects, chip 170 can be disposed beneath contact pad 150 (FIG. 1). As shown in FIG. 3, chip 170 can include can include an antenna 172 and processing circuitry 171 having a microprocessor 173, a NFC device 174, and a memory 176, which can store account information 178.

Memory 176 can store account information 178 and software for communicating with a bank or a credit service provider of a user. Account information 178 can include a customer identifier assigned to the user, which can be used to determine the identity of the user. Account information 178 can also identify an account of the user to facilitate payment from the identified account. In some aspects, account information 178 can identify transaction card 100. Accordingly, transaction card 100 and payment accounts associated with transaction card 100 can be identified together to facilitate payment from one or more payment accounts. Processing circuitry 171 can process information stored on memory 176 and communicate information to the card reader to facilitate a transaction when transaction card 100 is coupled to the card reader via antenna 172 or electrical connection. In this way, transaction card 100 can communicate with an external card reader. The communication can be via EMV protocol. Accordingly, multiple transactions of information can be completed to facilitate a payment. For example, EMV protocol may require authentication or other security measures. Account information 178 can facilitate authentication and payment processing.

In some aspects, antenna 172 can facilitate communication between chip 170 and an external card reader. In this way, the card reader can read account information 178 when coupled to contact pad 150 (FIG. 1) behind which chip 170 is located. When adjacent to the card reader, e.g., within about three inches or less of the card reader, antenna 172 can be energized by induction. Antenna 172 can send a signal to chip 170 such that processing circuitry 171 can detect a coupling between contact pad 150 (FIG. 1) behind which chip 170 is located and the external card reader. In some aspects, the signal can be in accordance with EMV protocol. In some aspects, the signal can indicate that the card reader is initiating a payment process with transaction card 100. Alternatively, transaction card 100 can be inserted into an external card reader. Contact pad 150 (FIG. 1) behind which chip 170 is located can then make an electrical connection with the card reader to transfer account information 178 from chip 170 and process a payment.

In some aspects, transaction card 100 can be powered by a card reader. In some aspects, transaction card 100 does not include a power source and is exclusively powered by a card reader. In some aspects, transaction card 100 can be powered via power source 190 and/or a card reader. With reference to FIG. 3, in some aspects, NFC device 174 can communicate according to NFC protocol and can facilitate sharing of account information 176 to an NFC-enabled external device for payment processing. In some aspects, the NFC-enabled external device can be a card reader (e.g., a payment device, smartphone, computer, etc.) In some aspects, NFC device 174 can be coupled to antenna 172. In some aspects, antenna 172 can communicate according to NFC protocol. In some aspects, NFC device 174 is powered by the external device. In some aspects, NFC device 174 can be energized by a signal from the external device. In some aspects, transaction card 100 additionally or alternatively can include a power source to power NFC device 174, e.g., power source 190. Accordingly, NFC device 174 can unilaterally energize its electromagnetic field.

Figure 5:
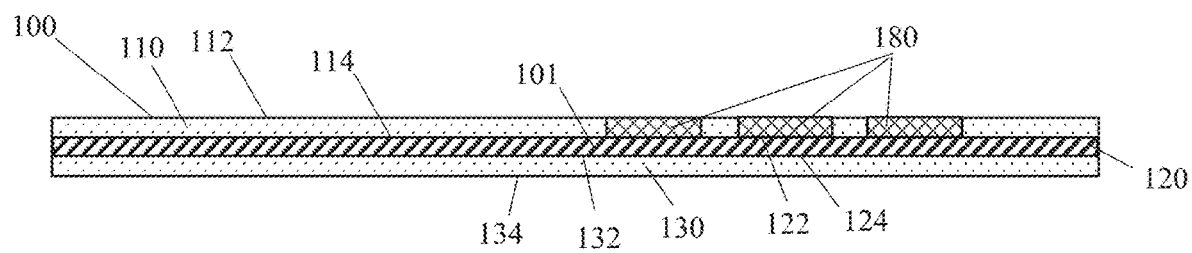
FIG. 5 shows a section view of the transaction card of FIG. 1 along line 5-5.

Transaction card 100 can be powered to illuminate light-penetrable top layer 110 and reveal information components 140 (FIG. 1). In some aspects, light-penetrable top layer 110 can also be a luminous layer. Switch 200 can be actuated to illuminate top layer 110 and reveal information components 140 (FIG. 1). As shown in FIG. 5, transaction card 100 can include one or more light sources 180. Light sources 180 can be energized to selectively illuminate information components 140 (FIG. 1) disposed in or on top layer 110 such that top layer 110 is a luminous layer. With reference to FIGS. 3-5, light sources 180 can be electrically coupled to NFC device 174 and/or power source 190 (e.g., via a PCB on middle layer 120, wires, etc.). Each of a plurality of light sources 180 can be electrically coupled to NFC device 174 and/or power source 190. Switch 200 can be electrically coupled to light sources 180 and power source 190. In some aspects, light sources 180, power source 190, and switch 200 can be integrated on a PCB on middle layer 120. In some aspects, light sources 180, power source 190, and switch 200 are replaceable with the PCB on middle layer 120. As switch 200 is actuated, light sources 180 can be energized. Releasing switch 200 can deenergize light sources 180. In some aspects, powering NFC device 174 can energize light sources 180. Accordingly, proximity to a NFC-enabled external device can energize light sources 180 to illuminate light-penetrable top layer 110 and reveal information components 140 (FIG. 1).

In some aspects, light sources 180 can include light bulbs (e.g., incandescent, fluorescent, halogen, etc.). In some aspects, light sources 180 can include photoluminescent materials. In some aspects, light sources 180 can be LED (light emitting diode) lights. In some aspects, the light bulbs or lights of light sources 180 are replaceable. In some aspects, light sources 180 can be disposed within top layer 110. In some aspects, light sources 180 can be disposed across one or more layers of transaction card 100, such as top layer 110 and middle layer 120; or top layer 110, middle layer 120, and bottom layer 130. In some aspects, light source 180 can be mounted on middle layer 120, for example. Accordingly, light source 180 can be mounted on middle layer 120, which can be a PCB layer. In some aspects, light source 180 mounted on middle layer 120 can extend into top layer 110. In some aspects, light sources 180 can be disposed along an edge of top layer 110 (FIG. 1). In some aspects, light sources 180 can be disposed along one or more edges of top layer 110 (FIG. 1). In some aspects, light sources 180 can be disposed along edge 109 of top layer 110 (FIG. 1). Accordingly, light sources 180 can laterally disperse light into central area 101 (FIG. 1) of transaction card 100.

Light sources 180 positioned along edge 109 (FIG. 1) can support edge lighting, or internal reflection. Light can be provided from a side of transaction card 100 into central area 101 (FIG. 1) of transaction card 100 to selectively illuminate information components 140 disposed on central area 101 (FIG. 1), which will now be described in more detail with reference to FIGS. 6-8.

Information components 140 can be formed in or on top layer 110 with one or more textures 142. Additionally or alternatively, information components 140 can be printed with reference to FIGS. 9-10. The construction of information components 140 and the remainder of transaction card 100 can support edge lighting, or internal reflection. For example, emitted light can be selectively released to control visibility of information components 140. As discussed above, top layer 110 can be a light-penetrable layer. Light can be emitted at a high angle into the light-penetrable layer material. However, rather than passing through the light-penetrable layer material, the light can be trapped. In other words, the light can be reflected inward. The reflection can prevent the light from exiting and illuminating the material. Information components 140 having textures 142 can assist light in escaping, allowing the area through which light escapes to become visible. Accordingly, textures 142 control visibility such that utilizing edge lighting and textures 142 facilitates selective illumination of information components 140 comprising textures 142. In some aspects, textures 142 can provide a material having a different refractive index in comparison to the remainder of one or more layers of transaction card 100, causing light to bend to follow a small enough angle (e.g., an angle below the critical angle for total internal reflection) and escape. Additionally or alternatively, textures 142 can provide edges, which can also allow light to escape. As the light contacts the edges, it can bend to follow a small enough angle and exit instead of reflecting inward. Therefore, information components 140 comprising textures 142 can appear invisible until selectively illuminated.

In some aspects, information components 140 can include one or more textures 142 that can be etched, milled, and/or carved on top layer 110 (FIG. 6). In some aspects, information components 140 can include textures 142 that are dimples 146 (e.g., protrusions made on top layer 110). In some aspects, information components 140 can include textures 142 that can be injection molded with top layer 110. In some aspects, top layer 110 can be a luminous layer as it facilitates illumination of information components 140. Additionally or alternatively, in some aspects, information components 140 can include textures 142 that can be printed on one or more layers, e.g., bottom layer 130.

In some aspects, information components 140 can be formed on top surface 112 of top layer 110. Accordingly, information components 140 can be disposed in top layer 110. As shown in FIG. 6, in some aspects, information components 140 can include one or more textures 142 that can, for example, be etched, milled, and/or carved onto top surface 112 of top layer 110. Etching, milling, and/or carving can create edges 144 of information components 140. As discussed above, information components 140 can include a variety of payment account data of a user, such as a card number, expiration date, and card verification value, each of which can be etched, milled, and/or carved onto top surface 112. Thus, information components 140 can be sensitive information including personal account data. Each identifying aspect of information components 140, e.g., letter or number, can be formed in top surface 112 such that edges 144 are created outlining information components 140. Because top layer 110 can be a light-penetrable layer, in a normal, or concealed, state in which light is not emitted by light sources 180 (FIG. 5), information components 140 formed on top layer 110 can appear invisible. As light is selectively emitted by light sources 180 (FIG. 5) and reflected internally, edges 144 provide by information components 140 can cause the light to bend to follow a small enough angle, allowing it to escape along edges 144. The escape of light illuminates edges 144 of information components 140, rendering the sensitive information provided by information components 140 visible. In some aspects, illuminating edges 144 renders information components 140 visible with respect to the remainder of top layer 110. The contrast between edges 144 and the remainder of top layer 110 can create visibility of information components 140 and the sensitive personal account data contained therein. In some aspects, edges 144 can be coated with a reflective material to facilitate selective surface reflection.

Figure 7:
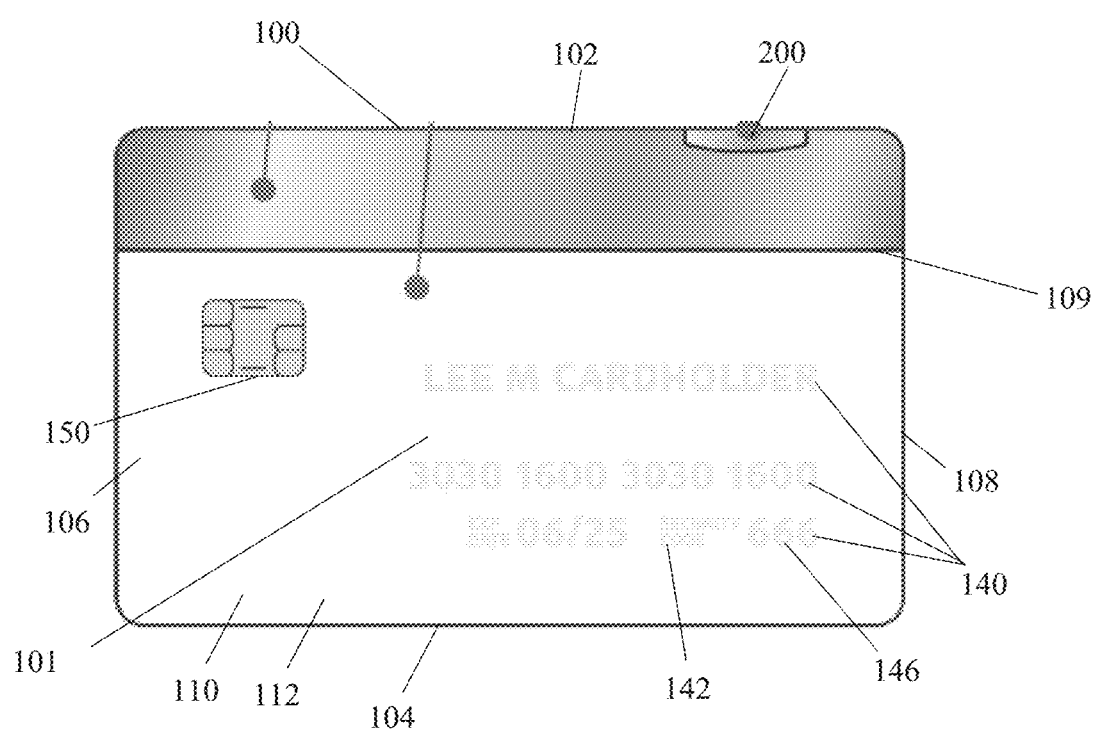
FIG. 7 shows a front view of a transaction card according to various aspects.

In some aspects, information components 140 can include one or more textures 142 that can, for example, be protrusions in top surface 112 of top layer 110. As shown in FIG. 7, in some aspects, protrusions made on top surface 112 can be dimples 146. In some aspects, dimples 146 can be curved protrusions outlining information components 140. As discussed above, information components 140 can include a variety of payment account data of a user, such as a card number, expiration date, and card verification value, each of which can be formed on top surface 112 using dimples 146. In other words, each identifying aspect of information components 140, e.g., letter or number, can be formed in top surface 112 using dimples 146. Dimpled surfaces can better facilitate light refraction in comparison to smooth surfaces, according to some aspects. For example, the light can refract differently between a dimpled surface and a smooth surface, causing the light to bend to follow a small enough angle and escape through dimples 146. For example, light can refract at a different angle between a smooth surface and curved dimples 146 such that the light can bend and escape. Accordingly, dimples 146 can create visibility of information components 140 and the sensitive personal account data contained therein. In some aspects, dimples 146 can be coated with a reflective material to facilitate selective surface reflection.

Figure 8:
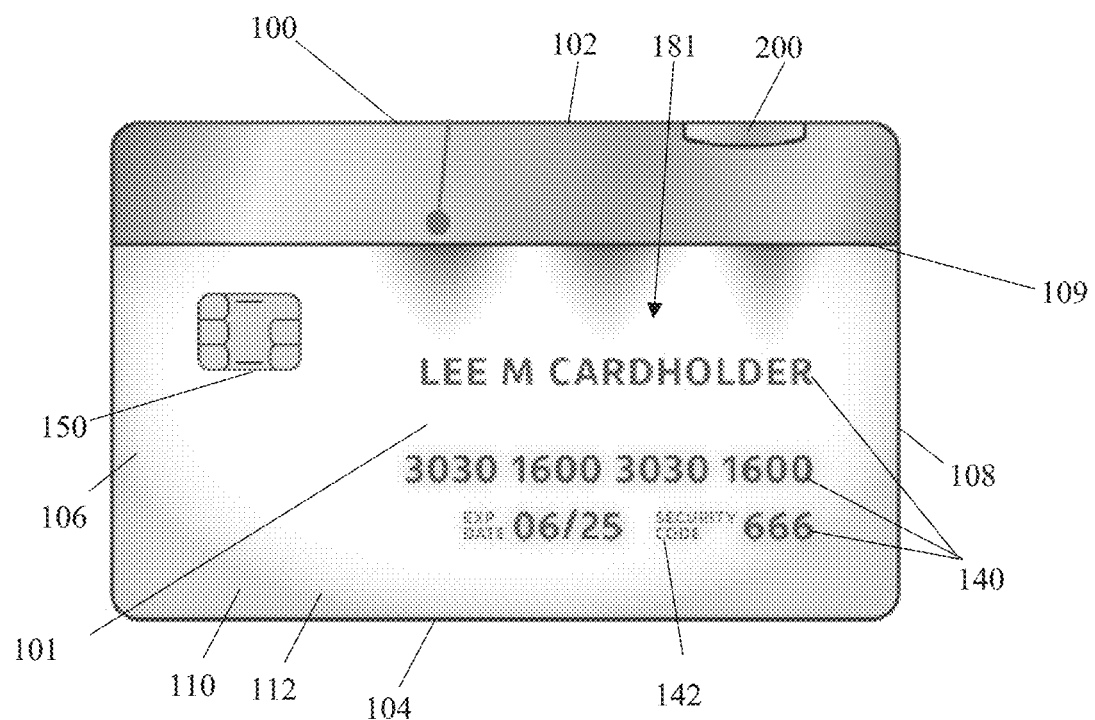
FIG. 8 shows a front view the transaction card of FIG. 1.

As shown in FIG. 8, selectively illuminating transaction card 100 can cause one or more information components 140 to become visible. Light 181 emitted by light sources 180 (FIG. 5) along edge 109 can be directed laterally toward and into central area 101 of transaction card 100, which can refer to central areas of one or more layers of transaction card 100. Light 181 can be internally reflected until it escapes through information components 140. In some aspects, information components 140 can be formed in top layer 110 with one or more textures 142 via etching, milling, carving, protrusions, and/or injection molding, for example. Top layer 110 can be a light-penetrable layer such that it allows light to pass through into transaction card 100, but traps light 181 emitted at a high angle into top layer 110, as light 181 is reflected inward from top layer 110 (e.g., internally within transaction card 100). Light 181 can be reflected inward until it reaches one or more textures 142 of information components 140, which can cause the light to bend to follow a small enough angle, allowing it to escape. Light 181 escaping along information components 140 can illuminate information components 140 with respect to the remainder of top layer 110 and/or any other layers of transaction card 100. As discussed above, as switch 200 is actuated, light sources 180 can be energized to disperse light 181 toward central area 101. Releasing switch 200 can deenergize light sources 180, return transaction card 100 to a concealed state in which light 181 is not dispersed, and information components 140 are not visible. Accordingly, information components 140 can be selectively illuminated to reveal the sensitive personal account data contained therein by alternatively actuating and releasing switch 200.

Figure 9:
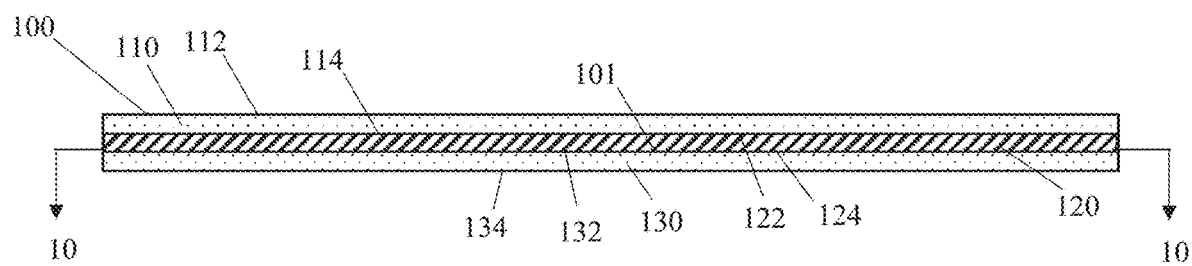
FIG. 9 shows a side view of a transaction card according to various aspects.
Figure 10:
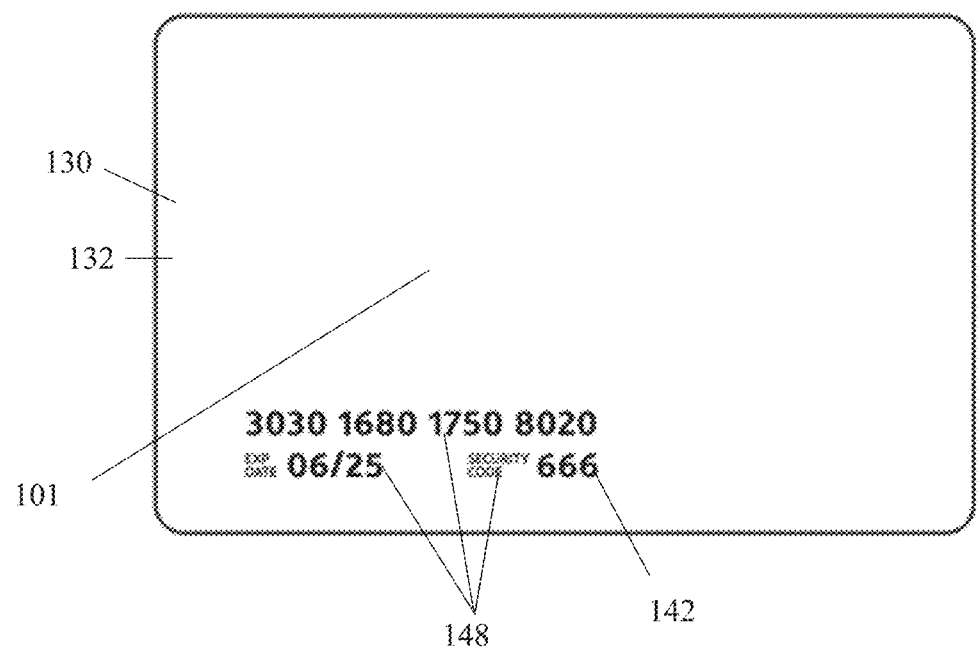
FIG. 10 shows a bottom layer of the transaction card of FIG. 9 along line 10-10.

Additionally or alternatively, in some aspects, information components 140 can be printed on one or more layers, e.g., bottom layer 130, as shown with respect to FIGS. 9-10. In some aspects, information components 140 can be screen printed. In some aspects, the refractive index of printed information components 140 can be increased to make information components 140 more visible with respect to a portion of transaction card 100 or the entirety of transaction card 100. In some aspects, as light 181 (FIG. 8) contacts printed information components 140, light 181 can be bent to make printed information components 140 more visible.

As shown in FIG. 10, textures 142 of information components 140 can additionally or alternatively include printing 148. In some aspects, printing 148 can be screen printed. As discussed above, information components 140 can include a variety of payment account data of a user, such as a card number, expiration date, and card verification value, each of which can be formed on top surface 112 using printing 148. In other words, each identifying aspect of information components 140, e.g., letter or number, can be formed in top surface 112 using printing 148. In some aspects, information components 140 can be formed on top surface 132 of bottom layer 130. Accordingly, information components 140 can be printed on top surface 132. In this way, information components 140 can be disposed in bottom layer 130 and, therefore, in transaction card 100. In some aspects, printing 148 can include material of a different refractive index than top layer 110 (FIG. 9). In some aspects, printing 148 can include material of a different refractive index than the remainder of bottom layer 130 and/or middle layer 120 (FIG. 9). In some aspects, printing 148 can include material of a different refractive index than the remainder of transaction card 100. Thus, light 181 (FIG. 8) is emitted by light sources 180 (FIG. 5) can bend to follow a small enough angle and escape after striking printing 148. In this way, printing 148 can create visibility of information components 140 and the sensitive personal account data contained therein.

In some aspects, bottom layer 130 can be opaque and/or can include one or more colors. In some aspects, printing 148 on bottom layer 130 can be of a different color than the remainder of bottom layer 130. In some aspects, printing 148 can include fluorescent material. In some aspects, printing 148 can be screen printed with ultraviolet light absorbing material, such as fluorescent material. In some aspects, light 181 (FIG. 8) is emitted by light sources 180 (FIG. 5) is ultraviolet light. For example, the wavelength of light 181 (FIG. 8) can be between approximately 100 and approximately 400 nm (nanometers), such as approximately 315 nm to approximately 400 nm, approximately 280 nm and approximately 315 nm, or approximately 100 nm and approximately 280 nm. Fluorescent printing 148 can convert ultraviolet light 181 into visible light, e.g., by absorbing and reflecting light 181 (FIG. 8) with a longer wavelength. In this way, fluorescent printing 148 can create visibility of information components 140 and the sensitive personal account data contained therein. In some aspects, bottom layer 130 can be non-opaque, e.g., clear, transparent, or translucent, such that transaction card 100 is entirely non-opaque. Accordingly, light 181 (FIG. 8) can illuminate information components 140 formed in bottom layer 130 and/or top layer 110 with one or more textures 142 (FIG. 8) to reveal sensitive personal account data contained therein.

Figure 11:
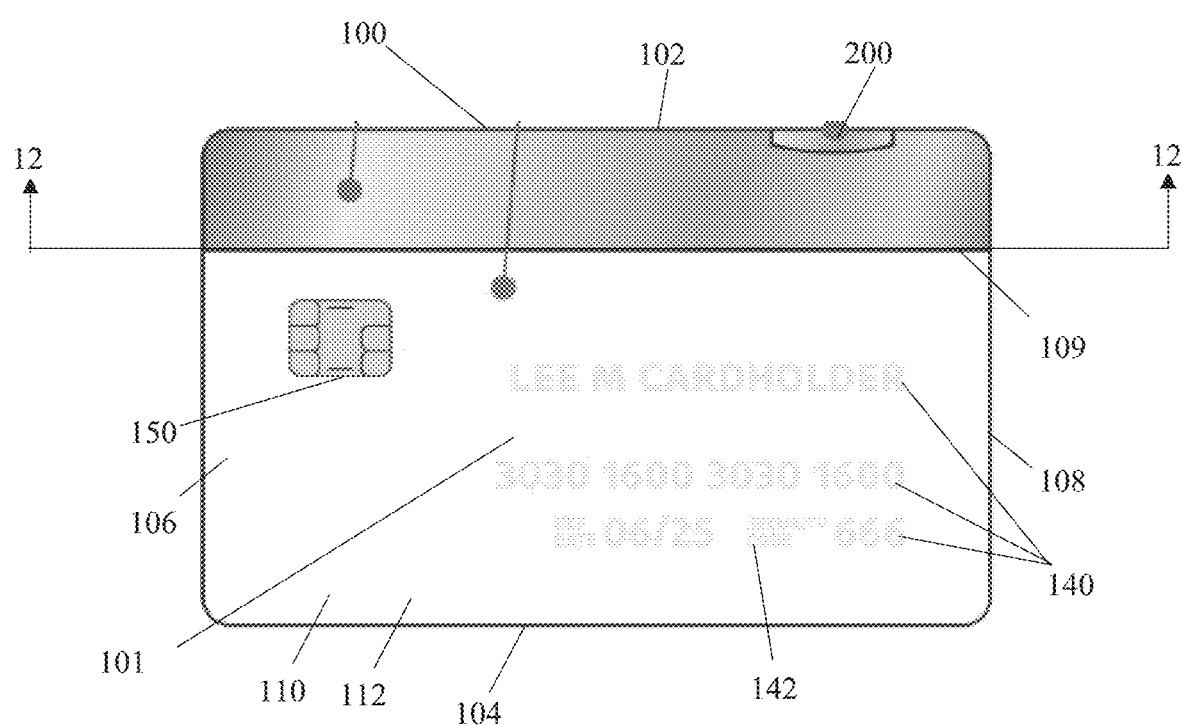
FIG. 11 shows a front view of a transaction card according to various aspects.
Figure 12:
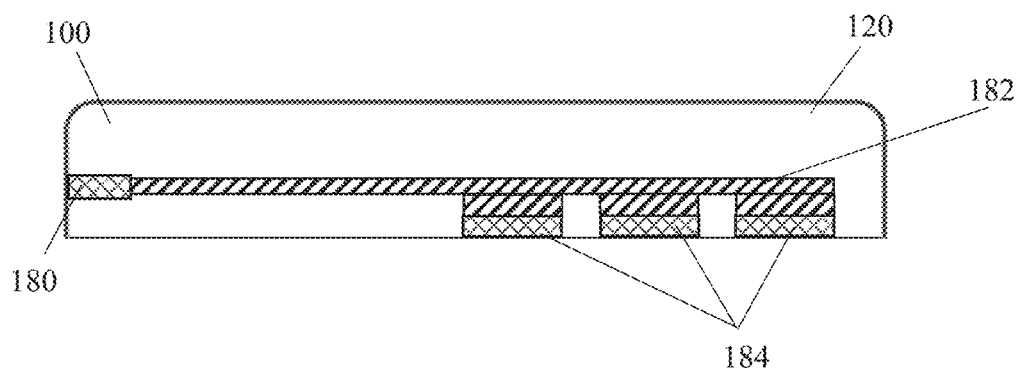
FIG. 12 shows a section view of the transaction card of FIG. 11 along line 12-12.

Based on the foregoing, information components 140 can appear invisible along with the remainder of top layer 110 until light escapes through information components 140. Information components 140 can be constructed to facilitate selective illumination to reveal the sensitive personal account data contained therein. Selective illumination can be caused by alternatively actuating and releasing switch 200. In some aspects, selective illumination can illuminate one or more information components 140, where information components 140 can include one or more of a card number, expiration date, and card verification value and/or other sensitive personal account data. With reference to FIGS. 11-12, a user can further select which information component 140 to illuminate. For example, each of a card number, expiration date, and card verification value can be selected for visibility. In another example, only a card number, or only an expiration date or card verification value, can be selected for visibility. In some aspects, transaction card 100 can include one or more structures to facilitate selective illumination of each information component 140.

As shown in FIG. 12, in some aspects, transaction card 100 can include one or more light pipes 182 and one or more outlets 184. In some aspects, light source 180 can be transmitted through light pipe 182. In some aspects, light 181 (FIG. 8) emitted from light source 180 can travel through a light pipe 182 and can selectively exit through one or more outlets 184. In some aspects, outlets 184 can be pipes that extend from light pipe 182. In some aspects, outlets 184 can be openings in light pipe 182. In some aspects, light pipe 182 and/or outlets 184 can include an acrylic material and/or glass, among others. In some aspects, light pipes 182 and/or outlets 184 can be rigid. In some aspects, light pipe 182 and/or outlets 184 can be flexible. In some aspects, outlets 184 can facilitate light 181 (FIG. 8) emission toward central area 101 to illuminate one or more information components 140 disposed in central area 101. In some aspects, light pipe 182 and/or outlets 184 guide light 181 (FIG. 8) to specific information components 140. For example, one outlet 184 can allow light to exit toward a specific information component 140, e.g., a card number. Another outlet 184 can allow light to exit toward another specific information component 140, e.g., an expiration date or a card verification value. In some aspects, depressing switch 200 can cause light source 180 to be powered such that light 181 (FIG. 1) travels through light pipe 182 and exits through one or more outlets 184.

Information components 140, e.g., a card number, an expiration date, or a card verification value, can each be separate components that can be selectively illuminated. In some aspects, multiple switches 200 can be operated to selectively disperse through outlets 184 and, therefore, to a selected information component 140. In some aspects, multiple switches 200 can be disposed on transaction card 100 to power multiple light source 180. Each light source 180 can correspond to a portion of light pipe 182 or a separate light pipe 182 and, therefore, a specific outlet 184 associated with a specific information component 140. In this way, actuating a switch 200 can energize a specific light source 180 to selectively disperse light 181 (FIG. 8) through a specific outlet 184 and, therefore, a selected information component 140. For example, a switch 200 can be operatively associated with an outlet 184 positioned along light pipe 182 to allow light to be dispersed toward a card number. Another switch 200 can be operatively associated with an outlet 184 positioned along light pipe 182 to allow light to be dispersed toward an expiration date or a card verification value. Accordingly, light 181 (FIG. 8) can exit light pipe 182 at selected locations and can be guided to selected information components 140 to selectively illuminate one or more information components 140.

Figure 13:
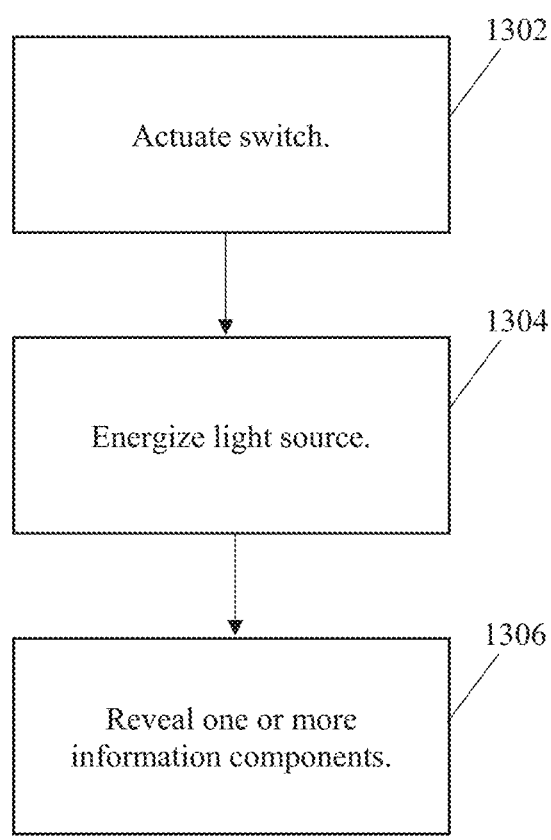
FIG. 13 shows an exemplary method of using a transaction card according to various aspects.

Some aspects described herein relate to a method of using transaction card 100, as shown in FIG. 13. In step 1302, a user can actuate one or more switches 200 on transaction card 100 to selectively illuminate one or more information components 140. In some aspects, a user can actuate one switch 200 to illuminate each information component 140, e.g., a card number, an expiration date, and a card verification value. In some aspects, a user can actuate a dedicated switch 200 to illuminate a specific information component 140. Accordingly, one switch 200 can be associated with one information component 140. In this way, a user can select which sensitive personal account data to render visible. In step 1304, actuating one or more switches 200 can energize one or more light sources 180. In some aspects, light sources 180 can be LED lights. In some aspects, light sources 180 emit ultraviolet light. In some aspects, switches 200 can be operatively coupled to power source 190 such that depressing switches 200 transfers power to light sources 180 to energize light sources 180. In some aspects, energizing light sources 180 emit light 181 toward central area 101 of transaction card 100. Light 181 can be internally reflected until it escapes through information components 140. In step, 1306, one or more information components can be revealed. In some aspects, information components 140 includes one or more textures 142, such as edges 144, dimples 146, and or printing 148. Textures 142 can cause the light to bend to follow a small enough angle such that it escapes after passing through information components 140, creating visibility of information components 140 and the sensitive personal account data contained therein. In some aspects, releasing switches 200 can return transaction card 100 to a concealed state in which information components 140 are not visible.

Figure 14:
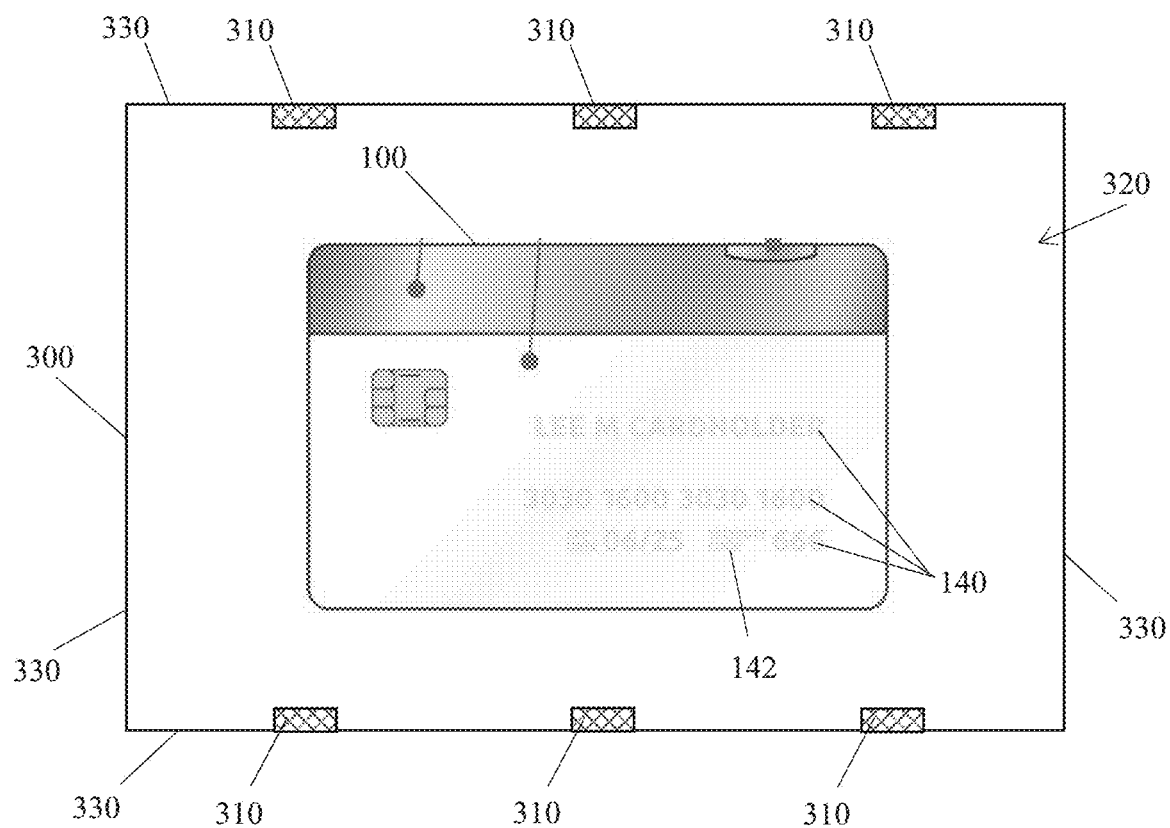
FIG. 14 shows an exemplary light box for use with a transaction card according to various aspects.

In some aspects, light sources in addition to light sources 180 can be used to render information components 140 visible. In some aspects, light sources external to transaction card 100 can ender information components 140 visible. In some aspects, transaction points having card readers can provide external light sources for users to reveal their sensitive personal account data in a secured location. In some aspects, devices can be used to provide external light sources. As shown in FIG. 14, a light box 300 can include one or more light sources 310. In some aspects, light sources 310 can be disposed on one or more walls 330 of light box 300. Light box 300 can be a receptacle for transaction card 100. In other words, transaction card 100 can be disposed in a cavity 320 of light box 300. Light box 300 can be powered by a portable power source and/or an external power source to energize one or more light sources 310. Light sources 310 can be positioned around light box 300 to direct any dispersed light toward cavity 320 and, therefore, transaction card 100 positioned in cavity 320. As light sources 310 are energized, light emitted from light sources 310 can pass through transaction card 100 having light-penetrating top layer 110. Light can be trapped in transaction card 100 and can be directed to escape through information components 140. In this way, light box 300 and components thereof can create visibility of information components 140 and the sensitive personal account data contained therein. In some aspects, deenergizing light sources 310 can return transaction card 100 to a concealed state in which information components 140 are not visible.

In some aspects, light box 300 can recharge power source 190 (FIG. 3). In some aspects power source 190 (FIG. 3) can be charged by a portable power source of light box 300 and/or by an external power source through light box 300.

It is to be appreciated that the Detailed Description section, and not the Summary and Abstract sections, is intended to be used to interpret the claims. The Summary and Abstract sections can set forth one or more but not all exemplary aspects of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the invention that others can, by applying knowledge within the skill of the art, readily modify and/or adapt for various applications such specific aspects, without undue experimentation, without departing from the general concept of the present invention. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary aspects, but should be defined only in accordance with the following claims and their equivalents.

What is claimed is:

1. A transaction card, comprising:
   a luminous layer comprising:
      a sensitive information component comprising personal account data;
   an LED light source to selectively illuminate the sensitive information component such that the sensitive information component refracts light from the LED light source to reveal the sensitive information component;
   a first power source to selectively energize the LED light source and illuminate the sensitive information component;
   a switch to energize and deenergize the LED light source; and
   a second power source coupled to the switch,
   wherein the first power source being powered by an external device.

2. The transaction card of claim 1, wherein the personal account data is a credit card number.

3. The transaction card of claim 1, wherein the personal account data is a card verification value.

4. The transaction card of claim 1, wherein the LED light source is disposed along an edge of the transaction card.

5. The transaction card of claim 1, wherein the LED light source illuminates the entire transaction card.

6. The transaction card of claim 1, further comprising:
   a second sensitive information component comprising personal account data.

7. The transaction card of claim 6, wherein the LED light source selectively illuminates the second sensitive information component such that the second sensitive information component refracts light from the LED light source to reveal the second sensitive information component.

8. The transaction card of claim 1, further comprising:
   a bottom layer,
   wherein a material of the luminous layer is different than a material of the bottom layer.

9. The transaction card of claim 1, further comprising:
   an EMV chip.

10. The transaction card of claim 1, wherein the luminous layer is transparent.

11. A transaction card, comprising:
    a luminous layer;
    a first sensitive information component disposed in the luminous layer and comprising personal account data;
    a first LED light source to selectively illuminate the first sensitive information component such that the first sensitive information component refracts light from the first LED light source to reveal the first sensitive information component;
    a first switch to energize and deenergize the first LED light source;
    a portable power source coupled to the first switch to selectively energize the first LED light source and illuminate the first sensitive information component;
    a second sensitive information component disposed in the luminous layer and comprising personal account data;
    a second LED light source to selectively illuminate the second sensitive information component such that the second sensitive information component refracts light from the second LED light source to reveal the second sensitive information component; and
    a second switch to energize and deenergize the second LED light source,
    wherein the portable power source is coupled to the second switch to selectively energize the second LED light source and illuminate the second sensitive information component.

12. The transaction card of claim 11, wherein the portable power source is disposed along an edge of the transaction card.

13. The transaction card of claim 11, wherein the first sensitive information component is printed, etched, pressed, or extruded.

14. The transaction card of claim 11, wherein the first sensitive information component is transparent.

15. The transaction card of claim 11, wherein the first sensitive information component is fluorescent.

16. A method of manufacturing a transaction card, the method comprising:
    providing a top layer and a bottom layer;
    forming a first sensitive information component on the top layer or the bottom layer, the first sensitive information component comprising personal account data;
    providing a first LED light source to selectively render visible the first sensitive information component when the first LED light source is energized;
    providing a first switch to energize and deenergize the first LED light source;
    providing a portable power source coupled to the first switch to selectively energize the first LED light source and render visible the first sensitive information component;
    forming a second sensitive information component on the top layer or the bottom layer, the second sensitive information component comprising personal account data;
    providing a second LED light source to selectively render visible the second sensitive information component when the second LED light source is energized; and
    providing a second switch to energize and deenergize the second LED light source,
    wherein the portable power source is coupled to the second switch to selectively energize the second LED light source and render visible the second sensitive information component.

17. The method of claim 16, wherein forming the first sensitive information component on the top or bottom layer comprises:
    forming a texture on the top or bottom layer.

18. The method of claim 16, further comprising:
    providing an EMV chip between the top layer and the bottom layer.

19. The transaction card of claim 1, wherein the external device comprises an external light source to illuminate the sensitive information component.

20. The transaction card of claim 11, further comprising a light pipe to guide light to at least one of the first or second sensitive information components.

* * * * *